United States Patent
Kim

(10) Patent No.: US 9,688,846 B2
(45) Date of Patent: Jun. 27, 2017

(54) RUBBER COMPOSITION FOR TIRE TREAD AND TIRE MANUFACTURED BY USING THE SAME

(71) Applicant: HANKOOK TIRE CO., LTD., Seoul (KR)

(72) Inventor: Byung Lip Kim, Yuseong-Gu (KR)

(73) Assignee: HANKOOK TIRE CO., LTD., Seoul (KR)

( * ) Notice: Subject to any disclaimer, the term of this patent is extended or adjusted under 35 U.S.C. 154(b) by 0 days.

(21) Appl. No.: 14/750,914

(22) Filed: Jun. 25, 2015

(65) Prior Publication Data

US 2015/0376382 A1 Dec. 31, 2015

(30) Foreign Application Priority Data

Jun. 30, 2014 (KR) ........................ 10-2014-0080745

(51) Int. Cl.
| | |
|---|---|
| *C08K 3/04* | (2006.01) |
| *C08L 9/08* | (2006.01) |
| *B60C 1/00* | (2006.01) |
| *C08J 3/22* | (2006.01) |

(52) U.S. Cl.
CPC .............. *C08L 9/08* (2013.01); *B60C 1/0016* (2013.04); *C08J 3/226* (2013.01); *C08J 2309/06* (2013.01); *C08J 2409/08* (2013.01); *C08J 2491/00* (2013.01); *C08J 2493/00* (2013.01); *C08L 2205/025* (2013.01)

(58) Field of Classification Search
CPC .............. C08L 9/08; C08J 3/226; C08K 3/04
USPC .................................. 524/77, 495, 525, 526
See application file for complete search history.

(56) References Cited

U.S. PATENT DOCUMENTS

2014/0256846 A1* 9/2014 Sevignon ................. C08J 3/215
523/156

FOREIGN PATENT DOCUMENTS

| CN | 103890069 A | 6/2014 |
|---|---|---|
| JP | 2004-238547 A | 8/2004 |
| JP | 2008-156419 | * 7/2008 |
| JP | 2008-156419 A | 7/2008 |
| JP | 2012-102239 A | 5/2012 |
| KR | 10-0709978 B1 | 4/2007 |
| KR | 2014-0030706 A | 3/2014 |

OTHER PUBLICATIONS

Office Action issued in Korean Pat. Appl. No. 10-2014-0080745 dated Sep. 15, 2015.
Office Action issued in Korean Patent Application No. 10-2014-0080743 dated Aug. 10, 2015.
Office action issued in Chinese Patent Appl. No. 201510386274.3 dated Sep. 2, 2016.

* cited by examiner

*Primary Examiner* — Edward Cain
(74) *Attorney, Agent, or Firm* — Marshall, Gerstein & Borun LLP

(57) ABSTRACT

Disclosed is a rubber composition for tire treads and a tire manufactured using the same. The rubber composition for tire treads includes 50 to 200 parts by weight of a wet masterbatch, 60 to 70 parts by weight of a raw rubber, and 50 to 200 parts by weight of a carbon black, the wet masterbatch being prepared by reacting 50 to 200 parts by weight of a carbon black, 20 to 100 parts by weight of a plant based resin and 50 to 200 parts by weight of a processing oil with respect to 100 parts by weight of a styrene-butadiene latex, according to a batchwise method. Accordingly, high grip performance is exhibited under a condition of heavy load, high slip and high speed, thereby being applicable to an ultra-high performance tire.

8 Claims, No Drawings

RUBBER COMPOSITION FOR TIRE TREAD AND TIRE MANUFACTURED BY USING THE SAME

TECHNICAL FIELD

The present disclosure relates to a rubber composition for tire treads and a tire manufactured using the same. More particularly, a rubber composition for tire treads that may be applied to an ultra-high tire by exhibiting ultra-high grip performance under a condition of heavy load, high slip and high speed, and a tire manufactured using the same.

BACKGROUND

Recently, according to development of high-end vehicles exhibiting high performances (conditions such as heavy load, high slip and high speed), and development of the tuning industry in order to satisfy high performances, high performance required performance in a tire is also required. When such requirements are not satisfied, entry into a high-end vehicle market is impossible, which is directly related to sales of companies. In particular, since supply of high-end vehicles is directly related to tire performance, the market is one of important markets which should be entered.

In general, ultra-high performance tires require enhanced high grip force and anti-wear properties under a condition of heavy load, high slip and high speed. In particular, when a reinforcing filler is included in a large amount in order to meet high vehicle performances of high-end vehicles, durability is enhanced but grip performance is decreased, thereby dramatically decreasing overall performances of a tire. In addition, when a petroleum based resin is included in a large amount in order to enhance high grip force and anti-wear properties under a condition of heavy load, high slip and high speed, the petroleum based resin may be non-uniformly dispersed, whereby processability of the rubber composition for tire treads may be decreased and it may be difficult to secure uniform properties.

SUMMARY

Therefore, the present disclosure has been made in view of the above problems, and it is an object of the presently described embodiments to provide a rubber composition for tire treads that may be applied to an ultra-high performance tire due to enhanced grip performance under a condition of heavy load, high slip and high speed.

It is another object of the presently described embodiments to provide a tire manufactured using the rubber composition for tire treads.

In accordance with an aspect of the present disclosure, the above and other objects can be accomplished by the provision of A rubber composition for tire treads, the rubber composition including: 50 to 200 parts by weight of a wet masterbatch, 60 to 70 parts by weight of a raw rubber, and 50 to 200 parts by weight of a carbon black, the wet masterbatch being prepared by reacting 50 to 200 parts by weight of a carbon black, 20 to 100 parts by weight of a plant based resin and 50 to 200 parts by weight of a processing oil with respect to 100 parts by weight of a styrene-butadiene latex, according to a batchwise method.

Regarding to the wet masterbatch, in the styrene-butadiene latex, the amount of styrene may be 40 to 60 wt %, and the amount of vinyl in butadiene may be 15 to 45 wt %

In addition, the plant based resin may have a softening point of 50 to 90° C.

In addition, the plant based resin may be selected from the group consisting of sesame resin, sunflower resin, coconut resin, palm resin, palm kernel resin, soya bean resin, rice resin, olive resin, geranium resin, chamomile resin, tea tree resin, lemon resin, jasmine resin, rose resin, lavender resin, camellia resin, caster resin, cotton seed resin, linseed resin, rape seed resin, arachis resin, rosin resin, pine resin, tall resin, corn resin, safflower resin, jojoba resin, macadamia nut resin, tung resin and mixtures thereof.

In addition, the processing oil may include 35±5 wt % of an aromatic ingredient, 28±5 wt % of a naphthenic ingredient, and 38±5 wt % of a paraffin based ingredient, with respect to a total weight of the processing oil.

In addition, in the processing oil, a content of benzo(a) pyrene (BaP) as an ingredient among polycyclic aromatic hydrocarbon (PAH) is 1 ppm or less, and a total content of eight PAH types such as benzo(a)pyrene (BaP), benzo(e) pyren (BeP), benzo(a)anthracene (BaA), chrysen (CHR), benzo(b)fluoranthene (BbFA), benzo(j)fluoranthene (BjFA), benzo(k)fluoranthene (BkFA) and dibenzo(a,h)anthracene may be 10 ppm or less.

In addition, in the rubber composition for tire treads and the wet masterbatch, carbon black each independently may have an iodine absorption amount of 200 to 1000 mg/g and an N-dibutyl phthalate (DBP) oil absorption amount of 150 to 800 ml/100 g.

In addition, the raw rubber may include a styrene-butadiene rubber in which a content of styrene is 30 to 50 wt %, a content of vinyl in butadiene is 40 to 65 wt %, a content of oil is 5 to 45 wt %, and glass transition temperature is −19° C. to −29° C.

According to an embodiment, a tire is manufactured using the rubber composition for tire treads.

DETAILED DESCRIPTION

Hereinafter, the present embodiments are described in more detail.

A rubber composition for tire treads according to an embodiment of the present disclosure includes 1) 50 to 200 parts by weight of a wet masterbatch, 2) 60 to 70 parts by weight of a raw rubber, and 3) 50 to 200 parts by weight of a carbon black.

Hereinafter, each ingredient is described in detail.

1) Wet masterbatch

In the rubber composition for tire treads, 1) the wet masterbatch is prepared by reacting 50 to 200 parts by weight of a carbon black, 20 to 100 parts by weight of a plant based resin and 50 to 200 parts by weight of a processing oil with respect to 100 parts by weight of a styrene-butadiene latex according to a batchwise method.

More particularly, 1) the wet masterbatch is polymerized for three to nine hours at 50 to 95° C. after inputting water into a batchwise reactor and inputting i) the styrene-butadiene latex, ii) carbon black, iii) the plant based resin and iv) the processing oil into the reactor, according to a batchwise method. After the reaction, moisture is evaporated while stirring a reaction product, and the reaction product may be extruded into a sheet type by passing through a roll.

In this case, i) the styrene-butadiene latex, ii) the carbon black, iii) the plant based resin and iv) a dispersant in order to enhance dispersibility of the processing oil may be used. The dispersant is not specifically limited so long as the dispersant may be used in general methods of manufacturing the wet masterbatch.

In addition, when reaction temperature is less than 50° C. upon preparation of the wet masterbatch, synthesis reaction between raw materials might not occur. When reaction temperature is greater than 95° C., water in the reactor is evaporated, and thus, dispersibility may be decreased. In addition, upon preparation of the wet masterbatch, synthesis reaction between raw materials might not occur when a reaction time is less than three hours, and, since additional reaction does not proceed when a reaction time exceeds nine hours, it is unnecessary to exceed nine hours.

In particular, in i) the styrene-butadiene latex used in preparation of the wet masterbatch, the content of styrene may be 40 to 60 wt %, and the content of vinyl in butadiene may be 15 to 45 wt %. The styrene-butadiene latex may enhance grip performance by increasing glass transition temperature (Tg) of a tread compound.

However, when mixing is performed using the styrene-butadiene latex in order to grip performance, processability and dispersibility may be very poor. In order to such a problem, in the rubber composition for tire treads according to the present disclosure, the styrene-butadiene latex is used with super fine carbon black particles having superior complementarity, processing oil and plant based oil having superior dispersibility.

That is, even though the styrene-butadiene latex has a high styrene content, it is difficult to realize high viscosity and handling. Accordingly, since there are disadvantages in various aspects such as processability and handling, dispersibility during mixing, the plant based resin is used with the processing oil in order to enhance advantages of the styrene-butadiene latex and overcome disadvantages. Accordingly, handling and dispersibility may be enhanced during mixing, and a rubber composition for tire treads having high glass transition temperature (Tg) and fast grip performance during high-speed driving may be prepared by applying the wet masterbatch to the rubber composition for tire treads.

When the wet masterbatch is prepared, ii) as carbon black, an ultra-high-density carbon black having an iodine absorption amount of 200 to 1000 mg/g, an N-dibutyl phthalate (DBP) oil absorption amount of 150 to 800 ml/100 g may be preferable. When an ultra-high-density carbon black having properties described above is used, hysteresis due to high heat generation during driving may be enhanced.

ii) The carbon black is preferably used in 50 to 200 parts by weight with respect to 100 parts by weight of i) the styrene-butadiene latex. When ii) the content of the carbon black is less than 50 parts by weight, reinforcement improvement effects according to use of the carbon black are insignificant. When the content of the carbon black exceeds 200 parts by weight, dispersibility of carbon black is decreased, and thus, properties of the rubber composition for tire treads may be deteriorated. When it is considered that improvement effects according to use of carbon black are significant, ii) the carbon black is more preferably used in an amount of 70 to 120 parts by weight with respect to 100 parts by weight of i) the styrene-butadiene latex.

In addition, when the wet masterbatch is prepared, iii) the plant based resin may preferably have a softening point of 50 to 90° C. Dispersibility of a plant based resin satisfying the softening point condition may be maximized within a reaction time. When the softening point of the plant based resin is less than 50° C., properties of the rubber composition for tire treads may be deteriorated. When the softening point exceeds 90° C., the plant based resin is not dissolved during reaction, and thus, dispersibility may be deteriorated. When significant improvement effects are considered, the plant based resin may preferably have a softening point of 70 to 90° C.

In particular, examples of the plant based resin includes sesame resin, sunflower resin, coconut resin, palm resin, palm kernel resin, soya bean resin, rice resin, olive resin, geranium resin, chamomile resin, tea tree resin, lemon resin, jasmine resin, rose resin, lavender resin, camellia resin, caster resin, cotton seed resin, linseed resin, rape seed resin, arachis resin, rosin resin, pine resin, tall resin, corn resin, safflower resin, jojoba resin, macadamia nut resin, or tung resin, and mixtures of one or more types among the resins may be used. When improvement effects through application of the plant based resin are considered, the corn resin may be more preferable.

iii) The plant based resin may be preferably used in an amount of 20 to 100 parts by weight with respect to 100 parts by weight of i) the styrene-butadiene latex. When the content of the plant based resin is less than 20 parts by weight, improvement effects according to use of the plant based resin are insignificant. When the content of the plant based resin exceeds 100 parts by weight, dispersibility is decreased, and thus, properties of the rubber composition for tire treads may be deteriorated due to non-uniform dispersion during processing. In addition, when significant improvement effects according use to the plant based resin are considered, iii) the plant based resin may be more preferably used in an amount of 50 to 100 parts by weight with respect to 100 parts by weight of i) the styrene-butadiene latex.

In addition, when the wet masterbatch is prepared, iv) the processing oil may preferably include 35±5 wt % of an aromatic ingredient, 28±5 wt % of a naphthenic ingredient and 38±5 wt % of a paraffin based ingredient with respect to the total weight of the processing oil.

In addition, as the processing oil, an eco-friendly residual aromatic extraction oil (RAE oil), in which the content of benzo(a)pyrene (BaP) as an ingredient among polycyclic aromatic hydrocarbon (PAH) is 1 ppm or less, and the total content of eight PAH types such as benzo(a)pyrene (BaP), benzo(e)pyren (BeP), benzo(a)anthracene (BaA), chrysen (CHR), benzo(b)fluoranthene (BbFA), benzo(j)fluoranthene (BjFA), benzo(k)fluoranthene (BkFA), dibenzo(a,h)anthracene is 10 ppm or less, may be more preferable.

iv) The processing oil may be preferably used in an amount of 50 to 200 parts by weight with respect to 100 parts by weight of i) the styrene-butadiene latex. When iv) the content of the processing oil is less than 50 parts by weight, a loading amount of a filler increases, and thus, heating and Mooney viscosity increase. Accordingly, processability may be deteriorated. When iv) the content of the processing oil exceeds 200 parts by weight, properties of the rubber composition for tire treads may be deteriorated. When improvement effects according to use of the processing oil are considered, iv) the processing oil may be more preferably used in an amount of 50 to 100 parts by weight with respect to 100 parts by weight of i) the styrene-butadiene latex.

2) Raw material rubber

Meanwhile, in the rubber composition for tire treads, Examples of 2) the raw rubber include polyisoprene rubber, polybutadiene rubber, conjugated diene aromatic vinyl copolymers, nitrile conjugated diene copolymers, hydrogenated NBR, hydrogenated NBR, olefin rubber, ethylene-propylene rubber modified with maleic acid, butyl rubber, a copolymer of isobutylene and aromatic vinyl or a diene monomer, acrylic rubber, ionomers, halogenated rubber, chloroprene rubber, or mixtures of one material type or two or more material types thereof. When improvement effects according to use of the raw rubber are considered, the raw rubber may preferably include styrene-butadiene rubber.

In addition, the styrene-butadiene rubber is rubber solution-polymerized according to a batchwise method. Preferably, the content of styrene is 30 to 50 wt %, the content of vinyl in butadiene is 40 to 65 wt %, the content of oil is 5 to 45 wt %, and Tg is −19 to −29° C. In addition, together with the conditions, the weight-average molecular weight of the styrene-butadiene rubber may preferably be 400,000 to 1000,000 g/mol, and a molecular weight distribution thereof may preferably be 1.1 or less.

In this case, the oil may preferably include, particularly, 35±5 wt % of an aromatic ingredient, 28±5 wt % of a naphthenic ingredient, 38±5 wt % of a paraffin based ingredient with respect to the total weight of the processing oil. In addition, as the processing oil, an eco-friendly residual aromatic extraction oil (RAE oil), in which the content of benzo(a)pyrene (BaP) as an ingredient among polycyclic aromatic hydrocarbon (PAH) is 1 ppm or less, and the total content of eight PAH types such as benzo(a)pyrene (BaP), benzo(e)pyren (BeP), benzo(a)anthracene (BaA), chrysen (CHR), benzo(b)fluoranthene (BbFA), benzo(j)fluoranthene (BjFA), benzo(k)fluoranthene (BkFA), dibenzo(a,h)anthracene is 10 ppm or less, may be more preferable.

When the solution-polymerized styrene-butadiene rubber satisfying constituents and properties such as the weight-average molecular weight and the molecular weight distribution described above is used, grip performance under a condition of heavy load, high slip, and high speed may be further enhanced.

The solution-polymerized styrene-butadiene rubber may be included in an amount of 60 wt % or more, or 60 to 70 wt % with respect to the total weight of the raw rubber. When the content of the styrene-butadiene rubber is less than 60 wt %, grip performance under a condition of heavy load, high slip and high speed may be deteriorated.

3) Carbon black

In the rubber composition for tire treads, carbon black that may be used as a reinforcing agent may be the same as carbon black that was previously used in 1) the wet masterbatch. In particular, ultra-high-density carbon black having an iodine absorption amount of 200 to 1000 mg/g and an N-dibutyl phthalate (DBP) oil absorption amount of 150 to 800 ml/100 g may be preferable.

The rubber composition for tire treads according to the present embodiments may include 1) 50 to 200 parts by weight of the wet masterbatch, 2) 60 to 70 parts by weight of the raw rubber, and 3) 50 to 200 parts by weight of a carbon black. When the content of the wet masterbatch is less than 50 parts by weight, improvement effects according to used of the wet masterbatch are insignificant. When the content of the wet masterbatch exceeds 200 parts by weight, dispersion time due to heating during reaction should be decreased. Accordingly, dispersity may be decreased. In addition, when the content of the raw rubber is less than 60 parts by weight, grip performance may be deteriorated under a condition of heavy load, high slip and high speed. When the content of the raw rubber exceeds 70 parts by weight, durability may be deteriorated. When the content of the carbon black is less than 50 parts by weight, improvement effects in durability and grip performance may be insignificant. When the content of the carbon black exceeds 200 parts by weight, much time is consumed until grip performance is exhibited, and processability may be deteriorated due to high heating.

4) Other additives

In addition, the rubber composition for tire treads may selectively, further include, other than ingredients of 1) to 3), a variety of additives such as a reinforcing filler, a processing oil, a vulcanizing agent, a vulcanization accelerator, a vulcanization acceleration aid, an aging preventing agent or an adhesive. The additives may be any one that is generally used in the art. The contents of additives are determined according to mixing ratios used in general rubber compositions for tire tread, and are not specifically limited.

In particular, the reinforcing filler is not specifically limited so long as the reinforcing filler may be used in general rubber compositions for tire tread. As a specific embodiment, silica may be used.

As the silica, silica such as precipitated silica prepared according to a wet method or a dry method may be used. In addition, as commercially available products, Ultrasil 7000Gr™ (manufactured by Evonik), Ultrasil 9000Gr™ (manufactured by Evonik), Zeosil 1165MP™ (manufactured by Rhodia), Zeosil 200MP™ (manufactured by Rhodia), Zeosil 195HR™ (manufactured by Rhodia), etc may be used.

Thereamong, when performance improvement effects and processability of silica in the rubber composition for tire treads are considered, a silica having nitrogen surface area per gram (N2SA) of 160 to 180 $m^2/g$ and cetyl trimethyl ammonium bromide (CTAB) adsorption surface area per gram of 150 to 1170 $m^2/g$ may be preferable. The nitrogen surface area per gram and CTAB adsorption surface area per gram conditions of the silica should be simultaneously satisfied. Accordingly, even though the nitrogen surface area per gram is satisfied, reinforcement by silica as a filler may be deteriorated when the CTAB adsorption surface area per gram of silica is less than 150 $m^2/g$. On the other hand, when the CTAB adsorption surface area per gram of silica exceeds 170 $m^2/g$, processability of rubber composition may be deteriorated. In addition, even though the CTAB adsorption surface area per gram is satisfied, reinforcement decreases when the nitrogen surface area per gram of silica is less than 160 $m^2/g$, and, when the nitrogen surface area per gram of silica exceeds 180 $m^2/g$, properties and processability of a tire may be deteriorated due to decrease of dispersibility.

The silica may be included in an amount of 70 to 100 parts by weight with respect to 100 parts by weight of the raw rubber. When the content of silica is less than 70 parts by weight, strength improvement in rubber is not satisfactory and brake performance of a tire may be decreased. When the content of silica exceeds 100 parts by weight, anti-wear performance and low fuel consumption performance may be deteriorated.

In addition, when silica is selectively, further used as a reinforcing filler, a silane coupling agent may be preferably used together in order to enhance dispersibility of silica in rubber. When the silane coupling agent is added, silica chemically binds with rubber while being organophilically modified in rubber through reaction with the silane coupling agent. Like this, when chemical characteristics of a silica surface are changed, movement of silica within rubber is limited, thereby decreasing hysteresis. As a result, heating and rotation resistance of the rubber composition may be decreased.

The silane coupling agent is not specifically limited so long as the silane coupling agent is used as a coupling agent for silica in general rubber compositions. In particular, the silane coupling agent may be selected from the group consisting of sulfide based silane compounds, mercapto based silane compounds, vinyl based silane compounds, amino based silane compounds, glycidoxy based silane compounds, nitro based silane compounds, chloro based silane compounds, methacrylic silane compounds and mixtures thereof.

The sulfide based silane compound may be any one selected from the group consisting of bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 2-trimethoxysilylethyl-N,N-dimethylthiocarbamoyltetrasulfide, 3-trimethoxysilylpropylbenzothiazolyltetrasulfide, 3-triethoxysilylpropylbenzothiazoletetrasulfide, 3-trimethoxysilylpropylmethacrylatemonosulfide, 3-trimethoxysilylpropylmethacrylatemonosulfide and mixtures thereof.

The mercapto silane compound may be any one selected from the group consisting of 3-mercaptopropyltrimethoxysilane, 3-mercaptopropyltriethoxysilane, 2-mercaptoethyltrimethoxysilane, 2-mercaptoethyltriethoxysilane and combinations thereof. The vinyl based silane compound may be any one selected from the group consisting of ethoxysilane, vinyltrimethoxysilane and combinations thereof. The amino based silane compound may be any one selected from the group consisting of 3-aminopropyltriethoxysilane, 3-aminopropyltrimethoxysilane, 3-(2-aminoethyl)aminopropyltriethoxysilane, 3-(2-aminoethyl)aminopropyltrimethoxysilane and combinations thereof.

The glycidoxy based silane compound may be any one selected from the group consisting of γ-glycidoxypropyltriethoxysilane, γ-glycidoxypropyltrimethoxysilane, γ-glycidoxypropylmethyldiethoxysilane, γ-glycidoxypropylmethyldimethoxysilane and combinations thereof. The nitro based silane compound may be any one selected from the group consisting of 3-nitropropyltrimethoxysilane, 3-nitropropyltriethoxysilane and combinations thereof. The chloro based silane compound may be any one selected from the group consisting of 3-chloropropyltrimethoxysilane, 3-chloropropyltriethoxysilane, 2-chloroethyltrimethoxysilane, 2-chloroethyltriethoxysilane and combinations thereof.

The methacrylic silane compound may be any one selected from the group consisting of γ-methacryloxypropyl trimethoxysilane, γ-methacryloxypropyl methyldimethoxysilane, γ-methacryloxypropyl dimethylmethoxysilane and combinations thereof.

When processability, miscibility with carbon black, and coupling effects for silica are considered upon preparing into a particulate, the sulfide based silane compounds among the silane coupling agents may be preferable. Thereamong, bis-(3-(triethoxysilyl)-propyl)-disulfide(bis-(3-(triethoxysilyl)-propyl)-disulfide: TESPD) or bis-(3-(triethoxysilyl)-propyl)-tetrasulfide(bis-(3-(triethoxysilyl)-propyl)-tetrasulfide: TESPT) may be more preferable.

The silane coupling agent is preferably used in an amount of 10 to 20 parts by weight with respect to 100 parts by weight of the raw rubber.

In addition, as other additives, the softening agent is added to a rubber composition in order to facilitate processing by imparting plasticity to rubber, or in order to decrease hardness of vulcanized rubber, and means processed oils or other materials that are used when rubber is blended or prepared. As the softening agent, any one selected from the group consisting of petroleum based oil, plant oils and combinations thereof may be used, but the present disclosure is not limited thereto.

As the petroleum based oil, any one selected from the group consisting of paraffin based oils, naphthene based oils, aromatic oils, and combinations thereof may be used.

Representative examples of the paraffin-based oils include P-1, P-2, P-3, P-4, P-5, P-6, etc. manufactured by Michang Oil Industrial Co., Ltd. Representative examples of the naphthene-based oils include N-1, N-2, N-3, etc. manufactured by Michang Oil Industrial Co., Ltd., and representative examples of the aromatic oils include A-2, A-3, etc. manufactured by Michang Oil Industrial Co., Ltd.

However, along with recently increased environmental awareness, it is known that, when the content of polycyclic aromatic hydrocarbons (hereinafter referred to as "PAHs") included in the aromatic oils is 3% or more, the cancer induction possibility is high. Accordingly, treated distillate aromatic extract (TDAE) oils, mild extraction solvate (MES) oils, residual aromatic extract (RAE) oils, or heavy naphthenic oils may be preferably used.

In particular, in the oil used as the softening agent, a total content of PAH components is 3% or less with respect to the total amount of the oil. Preferably, TDAE oils, wherein a kinematic viscosity is 95° C. or higher (210° F.), a content of aromatic components in softening agent is 15 to 25 wt %, a content of naphthene based components is 27 to 37 wt %, and a content of paraffin based components is 38 to 58 wt %, may be used.

The TDAE oils excellently enhance low-temperature characteristics and fuel consumption performance of a tire tread containing the TDAE oils, and also have advantageous characteristics against environmental factors such as cancer induction possibility of PAHs.

As the plant oil, any one selected from the group consisting of castor oil, cotton seed oil, linseed oil, canola oil, soybean oil, palm oil, coconut oil, peanut oil, pine oil, pine tar, tall oil, corn oil, rice bran oil, safflower oil, sesame oil, olive oil, sunflower oil, palm kernel oil, camellia oil, jojoba oil, macadamia nut oil, safflower oil, tung oil, and combinations thereof may be used.

The softening agent is preferably used in an amount of 1 to 10 parts or 5 to 10 parts by weight by weight with respect to 100 parts by weight of the raw rubber, from the viewpoint of improving processability of the raw rubber.

As the vulcanizing agent, a sulfur-based vulcanizing agent is preferably used. The sulfur-based vulcanizing agent may use an inorganic vulcanizing agent such as sulfur powder (S), insoluble sulfur (S), precipitated sulfur (S), or colloidal sulfur. In particular, as the sulfur-based vulcanizing agent, elemental sulfur, or a vulcanizing agent that produce sulfur, e.g., an amine disulfide or polymeric sulfur, may be used.

The vulcanizing agent is preferably included in an amount of 0.5 parts to 2 parts by weight with respect to 100 parts by weight of the raw rubber. In this case, the vulcanizing agent exhibits appropriate vulcanizing effects and the raw rubber is less sensitive to heat and is chemically stable.

The vulcanization accelerator means an accelerator that accelerates the rate of vulcanization or facilities the retarding action in an initial vulcanization stage.

The vulcanization accelerator may be any one selected form the group consisting of sulfenamide based compounds, thiazole based compounds, thiuram based compounds, thiourea based compounds, guanidine based compounds, dithiocarbamic acid based compounds, aldehyde amine based compounds, aldehyde ammonia based compounds, imidazoline-based compounds, xanthate based compounds and combinations thereof.

As the sulfenamide based vulcanization accelerators, any one sulfenamide based compound selected from the group consisting of, for example, N-cyclohexyl-2-benzothiazole sulfenamide (CBS), N-tert-butyl-2-benzothiazole sulfenamide (TBBS), N,N-dicyclohexyl-2-benzothiazole sulfenamide, N-oxydiethylene-2-benzothiazole sulfenamide, N,N-diisopropyl-2-benzothiazole sulfenamide and combinations thereof may be used.

As the thiazole based vulcanization accelerator, any one thiazole based compound selected from the group consisting of, for example, 2-mercaptobenzothiazole (MBT), dibenzothiazole disulfide (MBTS), sodium salts of 2-mercaptobenzothiazole, zinc salts of 2-mercaptobenzothiazole, copper salts of 2-mercaptobenzothiazole, cyclohexylamine salts of 2-mercaptobenzothiazole, 2-(2,4-dinitrophenyl)mercaptobenzothiazole, 2-(2,6-diethyl-4-morpholino thio)benzothiazole and combinations thereof may be used.

As the thiuram based vulcanization accelerator, for example, any one thiuram based compound selected from the group consisting of tetramethylthiuram disulfide (TMTD), tetraethylthiuram disulfide, tetramethylthiuram mono sulfide, dipentamethylenethiuram disulfide, dipentamethylenethiuram monosulfide, dipentamethylenethiuram tetrasulfide, dipentamethyelnethiuram hexasulfide, tetrabutylthiuram disulfide, pentamethylenethiuram tetrasulfide and combinations thereof may be used.

As the thiourea based vulcanization accelerator, any one thiourea based compound selected from the group consisting of, for example, thiocarbamide, diethylthiourea, dibutylthiourea, trimethylthiourea, di-ortho-tolylthiourea and combinations thereof may be used.

As the guanidine based vulcanization accelerator, any one guanidine based compound selected from the group consisting of, for example, diphenylguanidine, di-ortho-tolylguanidine, triphenylguanidine, ortho-tolylbiguanide, diphenylguanidine phthalate and combinations thereof may be used.

As the dithiocarbamic acid based vulcanization accelerator, any one dithiocarbamic acid based compound selected from the group consisting of, for example, zinc ethylphenyldithiocarbamate, zinc butylphenyldithiocarbamate, sodium dimethyldithiocarbamate, zinc dimethyldithiocarbamate, zinc diethyldithiocarbamate, zinc dibutyldithiocarbamate, zinc diamyldithiocarbamate, zinc dipropyldithiocarbamate, complex salts of zinc pentamethylenedithiocarbamate and piperidine, zinc hexadecylisopropyldithiocarbamate, zinc octadecylisopropyldithiocarbamate, zinc dibenzyldithiocarbamate, sodium diethyldithiocarbamate, piperidine pentamethylenedithiocarbamate, selenium dimethyldithiocarbamate, tellurium diethyldithiocarbamate, cadmium diamyldithiocarbamate and combinations thereof may used.

As the aldehyde amine based or aldehyde ammonia based vulcanization accelerator, an aldehyde amine based compound or an aldehyde ammonia based compound selected from the group consisting of, for example, acetaldehyde-aniline reaction products, butyraldehyde-aniline condensates, hexamethylenetetramine, acetaldehyde-ammonia reaction products and combinations thereof may be used.

As the imidazoline-based vulcanization accelerator, for example, an imidazoline-based compound such as 2-mercaptoimidazoline may be used, and as the xanthate based vulcanization accelerator, for example, a xanthate based compound such as zinc dibutyl xanthogenate may be used.

In order to maximize the increase of productivity through the acceleration of the rate of vulcanization, and to maximize improvement of rubber properties, the vulcanization accelerator may be included in an amount of 1.5 to 3.5 parts by weight with respect to 100 parts by weight of the raw rubber.

The vulcanization acceleration aid is a mixing agent used in combination with the vulcanization accelerator in order to perfect the accelerating effect, and may be any one selected from the group consisting of inorganic vulcanization acceleration aids, organic vulcanization acceleration aids, and combinations thereof.

As the inorganic vulcanization acceleration aid, any one selected from the group consisting of zinc oxide (ZnO), zinc carbonate, magnesium oxide (MgO), lead oxide, potassium hydroxide and combinations thereof may be used. As the organic vulcanization acceleration aid, any one selected from the group consisting of stearic acid, zinc stearate, palmitic acid, linoleic acid, oleic acid, lauric acid, dibutyl ammonium oleate, derivatives thereof and combinations thereof may be used.

In particular, zinc oxide and stearic acid may be used together as the vulcanization acceleration aid. In this case, zinc oxide is dissolved in stearic acid and forms an effective complex with the vulcanization accelerator, and thus, the complex produces free sulfur during the vulcanization reaction, thereby facilitating the cros slinking reaction of rubber.

When zinc oxide and stearic acid are used together, zinc oxide and stearic acid may be respectively used in amounts of 1 to 5 parts by weight and 0.5 to 3 parts by weight, in order to function as an adequate vulcanization acceleration aid. When the amounts of the zinc oxide and the stearic acid are below the range, vulcanization rate decreases and thus productivity may be deteriorated. When the amounts of the zinc oxide and the stearic acid exceed the range, scorching occurs and thus properties may be deteriorated.

The aging preventing agent is an additive used to stop the chain reactions in which the tire is auto-oxidized by oxygen. As the aging preventing agent, any one selected from the group consisting of amines, phenols, quinolines, imidazoles, carbamic acid metal salts, waxes and combinations thereof may be appropriately selected and used As the amine based aging preventing agent, any one selected from the group consisting of N-phenyl-N'-(1,3-dimethyl)-p-phenylenediamine, N-(1,3-dimethylbutyl)-N'-phenyl-p-phenylenediamine, N-phenyl-N'-isopropyl-p-phenylenediamine, N,N'-diphenyl-p-phenylenediamine, N,N'-diaryl-p-phenylenediamine, N-phenyl-N'-cyclohexyl-p-phenylenediamine, N-phenyl-N'-octyl-p-phenylenediamine and combinations thereof may be used. As the phenol based aging preventing agent, any one selected from the group consisting of 2,2'-methylenebis(4-methyl-6-tert-butylphenol), 2,2'-isobutylidenebis(4,6-dimethylphenol), 2,6-di-t-butyl-p-cresol and combinations thereof may be used. As the quinoline based aging preventing agent, 2,2,4-trimethyl-1,2-dihydroquinoline and derivatives thereof may be used, particularly, any one selected from the group consisting of 6-ethoxy-2,2,4-trimethyl-1,2-dihydroquinoline, 6-anilino-2,2,4-trimethyl-1,2-dihydroquinoline, 6-dodecyl-2,2,4-trimethyl-1,2-dihydroquinoline, and combinations thereof may be used. As the wax, waxy hydrocarbons may be preferably used.

The aging preventing agent, when, in addition to the aging preventing action, conditions such as high solubility in rubber and low volatility, nonreactivity with rubber, and non-inhibition of vulcanization are considered, the aging preventing agent may be included in an amount of 1 parts to 6 parts by weight with respect to 100 parts by weight of the raw rubber.

The adhesive contributes to enhancement of the properties of rubber by further enhancing adhesion between rubber and rubber, and improving compatibility, dispersibility and processability of other additives such as a filler.

As the adhesive, natural resin based adhesives such as rosin based resins and terpene based resins, and synthetic resin based adhesives such as petroleum resins, coal tar, and alkylphenol based resins may be used.

As the rosin-based resins, any one selected from the group consisting of rosin resin, a rosin ester resin, a hydrogenated rosin ester resin, derivatives thereof, and combinations thereof may be used. As the terpene based resins, any one selected from the group consisting of a terpene resin, a terpene phenol resin, and combinations thereof may be used.

As the petroleum resins, any one selected from the group consisting of aliphatic resins, acid-modified aliphatic resins, alicyclic resins, hydrogenated alicyclic resins, aromatic (C9) resins, hydrogenated aromatic resins, C5-C9 copolymer resins, styrene resins, styrene copolymer resins, and combinations thereof may be used.

The coal tar may be a coumarone-indene resin.

As the alkylphenol resins, p-tert-alkylphenol formaldehyde resins may be used, and the p-tert-alkylphenol formaldehyde resin may be any one selected from the group consisting of p-tert-butylphenol formaldehyde resin, p-tert-octylphenol formaldehyde, and combinations thereof.

The adhesive may be included in an amount of 2 to 4 parts by weight with respect to 100 parts by weight of the raw rubber. When the content of the adhesive is less than 2 parts by weight with respect to 100 parts by weight of the raw rubber, adhesion performance may be deteriorated, and when the content of the adhesive exceeds 4 parts by weight, rubber properties may be deteriorated.

The rubber composition for tire treads may be prepared through a general two-step process. That is, the rubber composition may be prepared in an appropriate mixer, using a first step of thermomechanically treating or kneading at high temperature of 110° C. to 190° C., preferably at high temperature of 130° C. to 180° C. and a second step of mechanically treating typically at low temperature of less than 110° C., e.g., 40° C. to 100° C. during a finishing step in which a cross-linking system is mixed, but the present disclosure is not limited thereto.

The rubber composition for tire treads may be included not only in the tread (tread cap and tread base), but also in various rubber constituent elements that constitute the tire. Examples of the rubber constituents include side walls, side wall inserts, apexes, chafers, wire coats, inner liners, etc.

A tire according to another embodiment is manufactured using the rubber composition for tire treads. A method of manufacturing a tire using the rubber composition for tire treads may be any one of conventional manufacturing methods, and detailed description therefore is omitted.

Examples of the tire include light truck radial (LTR) tires, ultra high performance (UHP) tires, tires for race cars, off-road tires, tires for airplanes, tires for agricultural machines, truck tires or bus tires. In addition, the tire may be a radial tire or a bias tire, and the radial tire is preferable.

A rubber composition for tire treads according to the present disclosure has enhanced grip performance under a condition of heavy load, high slip and high speed, and thus, may be applied to an ultra-high performance tire.

Hereinafter, the presently described embodiments will be described in detail by way of examples so that those having ordinary skill in the art can easily carry out the described embodiments. However, the presently described embodiments can be realized in various different forms, and is not intended to be limited to the examples described herein.

Manufacturing Example: Preparation of Rubber Composition

Rubber compositions for tire tread according to Examples and Comparative Examples were prepared using compositions summarized in Table 1 below. The rubber compositions were prepared according to a general rubber composition method.

TABLE 1

Unit: parts by weight

| | | Comparative Example 1 | Comparative Example 2 | Example 1 | Example 2 | Example 3 | Example 4 | Comparative Example 3 |
|---|---|---|---|---|---|---|---|---|
| Wet masterbatch[1] | | 120 | 130 | 140 | 160 | 180 | 200 | 210 |
| Composition of wet masterbatch | Styrene-butadiene latex | 100 | 100 | 100 | 100 | 100 | 100 | 100 |
| | Carbon black | 140 | 140 | 140 | 140 | 140 | 140 | 140 |
| | Corn resin | — | 10 | 20 | 40 | 60 | 80 | 90 |
| | RAE oil | 140 | 130 | 120 | 100 | 80 | 60 | 50 |
| Raw material rubber[2] | | 60 | 60 | 60 | 60 | 60 | 60 | 60 |
| Carbon black[3] | | 100 | 100 | 100 | 100 | 100 | 100 | 100 |
| Petroleum based resin[4] | | 20 | 10 | — | — | — | — | — |
| Softening agent[5] | | 5 | 5 | 5 | 5 | 5 | 5 | 5 |
| Aging preventing agent | | 6 | 6 | 6 | 6 | 6 | 6 | 6 |
| Vulcanizing agent | | 0.8 | 0.8 | 0.8 | 0.8 | 0.8 | 0.8 | 0.8 |
| Vulcanization accelerator | | 3 | 3 | 3 | 3 | 3 | 3 | 3 |

[1]Wet masterbatch: with respect to 100 parts by weight of a styrene-butadiene latex including 40 to 60 wt % of styrene and 15 to 45 wt % of vinyl in butadiene, carbon black having an iodine absorption amount of 200 to 1000 mg/g and a DBP oil absorption amount of 150 to 800 cc/100 g; and RAE oil including 35 ± 5 wt % of an aromatic ingredient, 28 ± 5 wt % of a naphthenic ingredient and 38 ± 5 wt % of a paraffin based ingredient; and/or corn resin having a softening point of 50 to 90° C. were input into a reactor containing water in the contents summarized in Table 1, and dispersion was performed using a dispersant. Subsequently, reaction was performed for six hours at 95° C. according to a batchwise method, thereby preparing wet masterbatch rubber.
[2]Raw material rubber: styrene-butadiene rubber was polymerized and prepared according to a batchwise method. The styrene-butadiene rubber includes 5 to 45 parts by weight of RAE oil that includes 30 to 50 wt % of styrene the content, 40 to 65 wt % of vinyl in butadiene, 35 ± 5 wt % of an aromatic ingredient, 28 ± 5 wt % of a naphthenic ingredient and 38 ± 5 wt % of a paraffin based ingredient, and having Tg of −19 to −29° C.
[3]Carbon black: super fine carbon black particles having an iodine($I_2$) absorption amount of 200 to 1000 mg/g, a DBP oil absorption amount of 150 to 800 ml/100 g.
[4]Petroleum based resin: petroleum based resin having a softening point of 50 to 90° C.
[5] Softening agent: oil in which the total content of a polycyclic aromatic hydocarbo (PAH) is 3 wt % or less ingredient, kinetic viscosity is 95° C. (210° F.), and the contents of an aromatic ingredient, naphthenic ingredient and paraffin based ingredient in a softening agent are 25 wt %, 32.5 wt % and 47.5 wt %, respectively.

Experimental Example 1: Property Measurement of Prepared Rubber Compositions

Properties of rubber specimens manufactured according to Examples and Comparative Examples were measured according to methods below. Results are summarized in Table 2 below.

Mooney viscosity (ML1+4(125° C.)) was measured according to ASTM standard D1646. ML1+4 means a value representing viscosity of unvulcanized rubber. With decreasing value, processability of the unvulcanized rubber is superior.

Hardness was measured according to DIN 53505. Hardness represents driving safety, and the driving safety is superior with increasing value.

300% modulus was measured according to ISO 37 standard.

In regard to viscoelasticity, G', G" and tan δ were measured at −60° C. up to 80° C. in 0.5% strain under 10 Hz frequency using an RDS meter. 60° C. tan δ indicates rotation resistance characteristics, and, in the case of an ultra-high performance tire, grip performance is superior with increasing value.

TABLE 2

|  | Comparative Example 1 | Comparative Example 2 | Example 1 | Example 2 | Example 3 | Example 4 | Comparative Example 3 |
| --- | --- | --- | --- | --- | --- | --- | --- |
| Mooney viscosity (ML1 + 4(125° C.)) | 54 | 54 | 53 | 52 | 50 | 47 | 45 |
| Hardness (ShoreA) | 54 | 54 | 53 | 51 | 49 | 47 | 45 |
| 300% modulus | 62 | 62 | 61 | 58 | 55 | 53 | 50 |
| 60° C. tanδ | 0.221 | 0.220 | 0.218 | 0.222 | 0.231 | 0.244 | 0.257 |

In addition, treads were prepared using the rubber prepared according to Comparative Examples and Examples, and 240/640R18 F200 standard tires including the tread rubber as a semi-product were manufactured. The manufactured tires were subjected to measurement of anti-wear performance on a dry road, brake performance on a dry road, and a grip rate. Results are summarized in Table 3 below as relative ratios to the results of Comparative Example 1.

TABLE 3

|  | Comparative Example 1 | Comparative Example 2 | Example 1 | Example 2 | Example 3 | Example 4 | Comparative Example 3 |
| --- | --- | --- | --- | --- | --- | --- | --- |
| Anti-wear performance | 100 | 102 | 101 | 100 | 98 | 96 | 94 |
| Brake performance on dry road | 100 | 102 | 111 | 115 | 117 | 120 | 122 |
| Grip ratio | 100 | 111 | 121 | 126 | 130 | 133 | 136 |

As shown in Tables 1 and 2, in Examples 1 to 4 in which the plant based resin was applied to the wet masterbatch and used, grip performance was increased by 30% or more, with respect to Comparative Examples 1 to 3. Accordingly, in Examples 1 to 4, superior brake performance was exhibited.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A rubber composition for tire treads, the rubber composition comprising:
50 to 200 parts by weight of a wet masterbatch,
60 to 70 parts by weight of a raw rubber, and
50 to 200 parts by weight of a carbon black,
wherein the wet masterbatch is prepared by reacting 50 to 200 parts by weight of a carbon black, 20 to 100 parts by weight of a plant based resin and 50 to 200 parts by weight of a processing oil with respect to 100 parts by weight of a styrene-butadiene latex, according to a batchwise method, and wherein the plant based resin has a softening point of 50 to 90° C.

2. The rubber composition according to claim 1, wherein, in the styrene-butadiene latex, an amount of styrene is 40 to 60 wt %, and an amount of vinyl in butadiene is 15 to 45 wt %.

3. The rubber composition according to claim 1, wherein the plant based resin is selected from the group consisting of sesame resin, sunflower resin, coconut resin, palm resin, palm kernel resin, soya bean resin, rice resin, olive resin, geranium resin, chamomile resin, tea tree resin, lemon resin, jasmine resin, rose resin, lavender resin, camellia resin, caster resin, cotton seed resin, linseed resin, rape seed resin, arachis resin, rosin resin, pine resin, tall resin, corn resin, safflower resin, jojoba resin, macadamia nut resin, tung resin and mixtures thereof.

4. The rubber composition according to claim 1, wherein the processing oil comprises 35±5 wt % of an aromatic ingredient, 28±5 wt % of a naphthenic ingredient, and 38±5 wt % of a paraffin based ingredient, with respect to a total weight of the processing oil.

5. The rubber composition according to claim 1, wherein, in the processing oil, a content of benzo(a)pyrene (BaP) as an ingredient among polycyclic aromatic hydrocarbon (PAH) is 1 ppm or less, and
a total content of eight PAH types such as benzo(a)pyrene (BaP), benzo(e)pyren (BeP), benzo(a)anthracene (BaA), chrysen (CHR), benzo(b)fluoranthene (BbFA), benzo(j)fluoranthene (BjFA), benzo(k)fluoranthene (BkFA) and dibenzo(a,h)anthracene is 10 ppm or less.

6. The rubber composition according to claim 1, wherein, in the rubber composition for tire treads and the wet masterbatch, the carbon black each independently has an iodine absorption amount of 200 to 1000 mg/g and an N-dibutyl phthalate (DBP) oil absorption amount of 150 to 800 ml/100 g.

7. The rubber composition according to claim 1, wherein the raw rubber comprises a styrene-butadiene rubber in which a content of styrene is 30 to 50 wt %, a content of vinyl in butadiene is 40 to 65 wt %, a content of oil is 5 to 45 wt %, and glass transition temperature is $-19°$ C. to $-29°$ C.

8. A tire manufactured using the rubber composition for tire treads according to claim 1.

* * * * *